United States Patent [19]
McKim

[11] Patent Number: 5,414,814
[45] Date of Patent: May 9, 1995

[54] I/O INTERFACE BETWEEN VME BUS AND ASYNCHRONOUS SERIAL DATA COMPUTER

[75] Inventor: Dale W. McKim, Fredericksburg, Va.

[73] Assignee: The United States of America as represented by the Secretary of the Navy, Washington, D.C.

[21] Appl. No.: 880,271

[22] Filed: May 8, 1992

[51] Int. Cl.⁶ ............................................. G06F 13/00
[52] U.S. Cl. ............................. 395/275; 364/DIG. 1; 364/241.6; 364/239
[58] Field of Search ........................................ 395/275

[56] References Cited

U.S. PATENT DOCUMENTS

| | | | |
|---|---|---|---|
| 4,569,062 | 2/1986 | Dellande et al. | 375/117 |
| 4,604,682 | 8/1986 | Schwan et al. | 364/200 |
| 4,625,307 | 11/1986 | Tulpule et al. | 370/85 |
| 4,642,761 | 2/1987 | Yanagiuchi et al. | 364/200 |
| 4,644,462 | 2/1987 | Matsubara et al. | 364/200 |
| 4,695,952 | 9/1987 | Howland | 364/200 |
| 4,700,292 | 10/1987 | Campanini | 364/200 |
| 4,750,149 | 6/1988 | Miller | 364/900 |
| 4,794,520 | 12/1988 | Kobus, Jr. et al. | 364/200 |
| 4,794,525 | 12/1988 | Pickert et al. | 364/200 |
| 4,873,626 | 10/1989 | Gifford | 364/200 |
| 4,933,835 | 6/1990 | Sachs et al. | 364/200 |
| 4,939,735 | 7/1990 | Fredericks et al. | 371/58 |
| 4,977,494 | 12/1990 | Gabaldon et al. | 364/167.01 |
| 4,999,787 | 3/1991 | McNally et al. | 364/514 |
| 5,047,921 | 9/1991 | Kinter et al. | 364/200 |
| 5,131,272 | 7/1992 | Minei et al. | 73/431 |
| 5,134,702 | 7/1992 | Charych et al. | 395/880 |
| 5,175,819 | 12/1992 | Le Ngoc et al. | 395/250 |
| 5,226,173 | 7/1993 | Sasaki et al. | 395/800 |
| 5,247,652 | 9/1993 | Uda | 395/800 |
| 5,283,869 | 2/1994 | Adams et al. | 395/200 |

OTHER PUBLICATIONS

Military Standard 1397B(Navy), 3 Mar. 1989, Sections 5.3 and 5.4 particularly relevant.

*Primary Examiner*—Christopher B. Shin
*Attorney, Agent, or Firm*—Jacob Shuster

[57] ABSTRACT

A computer interface is provided to support communication between a VMEbus architecture and a computer having its input/output (I/O) interface based on MIL-STD 1397B Type D or E asynchronous serial data specifications. A dual port RAM provides temporary storage for VMEbus data being transferred to the computer and computer data being transferred to the VMEbus. Both the VMEbus data and computer data are stored in a VMEbus parallel format. An interrupt controller is responsive to interrupt control signals on the VMEbus and a local bus. The interrupt controller places a processor interrupt on the local bus in response to an interrupt control signal on the VMEbus, and places a VME interrupt on the VMEbus in response to an interrupt control signal on the local bus. A processor, responsive to the processor interrupt, generates a write control signal and transfers the VMEbus data stored in the dual port RAM onto the local bus. An interface controller, responsive to the write control signal and a select signal indicative of one of the type D or E I/O interface specifications, converts the VMEbus data transferred onto the local bus into asynchronous serial data in accordance with MIL-STD 1397B. The interface controller also is responsive to a request-to-send control signal from the computer to convert asynchronous serial data from the computer into computer data. The processor, also responsive to the request-to-send control signal, generates a read control signal and the interrupt control signal on the local bus. The interface controller, responsive to the read control signal, transfers the computer data to the dual port RAM via the local bus.

7 Claims, 5 Drawing Sheets

I/O INTERFACE BETWEEN VME BUS AND ASYNCHRONOUS SERIAL DATA COMPUTER

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to input/output (I/O) interfaces between a parallel computer architecture and a serial computer architecture, and more particularly to an interface between an industry standard VMEbus and a computer implementing asynchronous serial data I/O according to the Military Standard 1397B type D or E interface.

BACKGROUND OF THE INVENTION

A wide variety of military application computers implement the Military Standard 1397B Type D or E interface for purposes of input and output (I/O). In brief, the type D interface is based on asynchronous serial data transfer using a 10 MHz clock and bipolar ±3.25 volts nominal. The type E interface is based on asynchronous serial data transfer using a 10 MHz clock and bipolar ±0.6 volts nominal. For a more detailed description of the interface specifications, see MIL-STD 1397B, Mar. 3, 1989, which is herein incorporated by reference. Of special interest is Section 5.3 concerning the Type D interface, and Section 5.4 entitled "Type E NATO low-level serial interface."

Prior to being placed in the field, testing of these computers is typically carried out on a simulator. While simulators may be custom designed for any specific computer, it is desirable to use a simulator that incorporates industry standard features and components. In this way, the cost of the simulator is minimized, the flexibility in design of the simulator is increased and the simulator may be used for a variety of application computers. One such industry standard feature is the VMEbus architecture, which is well known in the art. Unfortunately, VMEbus architecture is based on parallel I/O transfer. In order for a computer implementing the Type D/E interface to interface with a VMEbus architecture (simulator), it is necessary to convert I/O data streams to appropriate asynchronous serial formats.

SUMMARY OF THE INVENTION

Accordingly, it is an object of the present invention to provide a computer interface for supporting communication between a VMEbus architecture and a computer that sends/receives data in accordance with the Military Standard 1397B Type D or E interface.

Other objects and advantages of the present invention will become more obvious hereinafter in the specification and drawings.

In accordance with the present invention, a computer interface is provided to support communication between a VMEbus architecture and a computer having its input/output (I/O) interface based on MIL-STD 1397B Type D or E asynchronous serial data specifications. A memory provides temporary storage for VMEbus data being transferred from the VMEbus to the computer and computer data being transferred from the computer to the VMEbus. Both the VMEbus data and computer data are stored in a VMEbus parallel format. A local bus provides a transfer path within the computer interface. An interrupt controller is responsive to interrupt control signals on the VMEbus and the local bus. The interrupt controller places a processor interrupt on the local bus in response to an interrupt control signal on the VMEbus, and places a VME interrupt on the VMEbus in response to an interrupt control signal on the local bus. A processor, responsive to the processor interrupt, generates a write control signal and transfers the VMEbus data stored in the memory onto the local bus. An interface controller, responsive to the write control signal and a select signal indicative of one of the type D or E I/O interface specifications, converts the VMEbus data transferred onto the local bus into asynchronous serial data in accordance with MIL-STD 1397B. The interface controller also is responsive to a request-to-send control signal from the computer to convert asynchronous serial data from the computer into computer data. The processor, also responsive to the request-to-send control signal, generates a read control signal and the interrupt control signal on the local bus. The interface controller, responsive to the read control signal, transfers the computer data to the memory via the local bus.

DETAILED DESCRIPTION OF THE INVENTION

Figure 1:
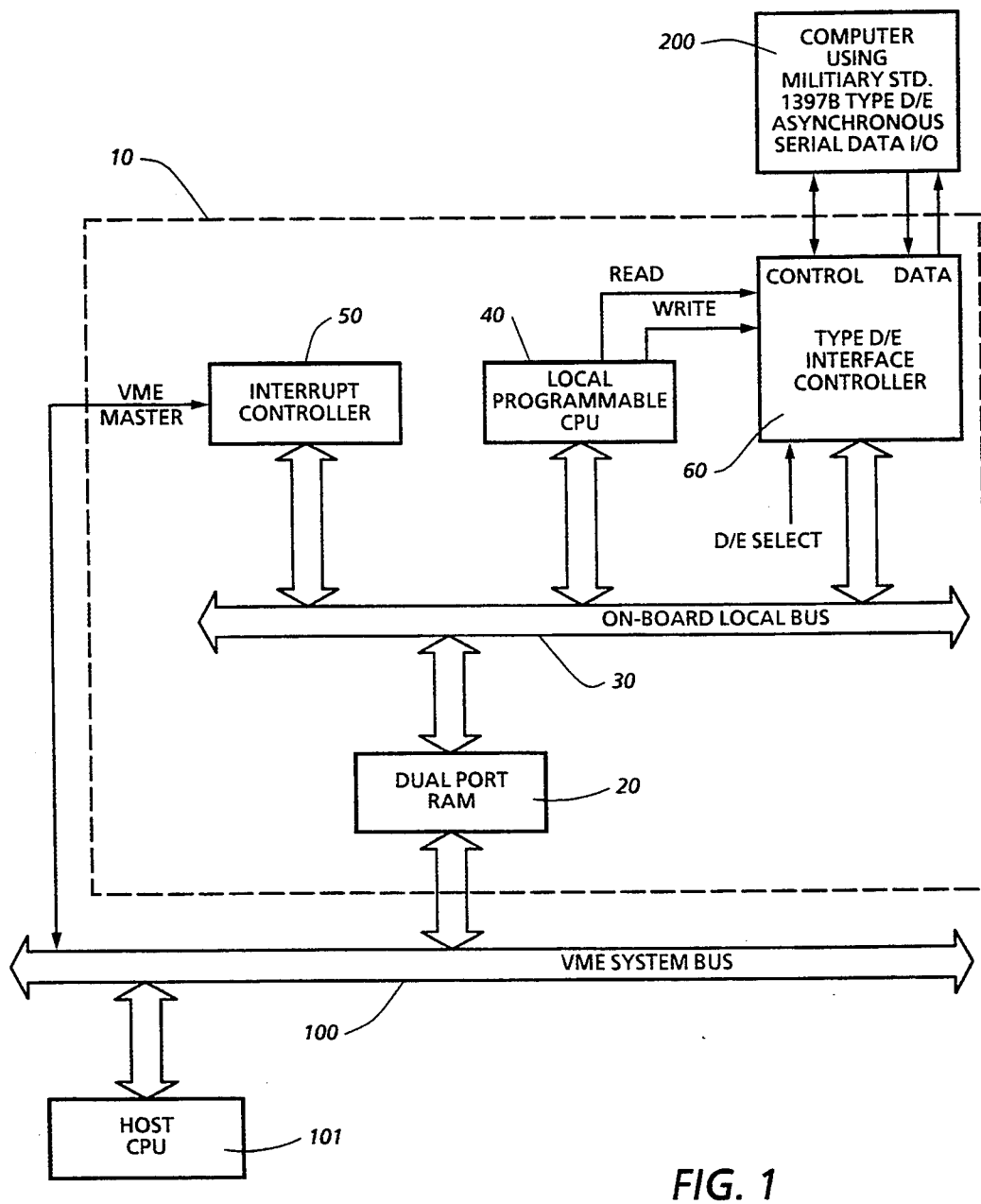
FIG. 1 is a top level block diagram of the computer interface according to the present invention.

Referring now to the drawings, and more particularly to FIG. 1, a top level block diagram of a computer interface 10 is shown that supports communication between a VME system bus 100 (hereinafter referred to as VMEbus) and a computer 200 that implements the Military Standard 1397B Type D or E interface for purposes of input/output (I/O). The basic elements of interface 10 include a dual port random access memory (RAM) 20, an on-board local bus 30, a local programmable central processing unit (CPU) 40, an interrupt controller 50 and a type D/E interface controller 60. Dual port RAM 20 provides interface 10 with local on-board RAM and provides the VMEbus 100 with a shared memory interface. By way of example, dual port RAM 20 may be configured as a 16K×16-bit dual port RAM made, for example, by Integrated Device Technology, Part Nos. IDT 7M135 and IDT 7M145. The upper half of the RAM would be mapped to the base address of the VMEbus 100 and the lower half of the RAM would be used as local on-board memory accessible only from the local programmable CPU 40. As is known in the art, such a dual port RAM performs bus arbitration when both ports access the same location in memory.

Local CPU 40 could consist of any general purpose programmable microprocessor such as the 80286, 386, etc. and is not a limitation on the present invention. Interrupt controller 50 serves as a bidirectional interface for passing a VME MASTER control between VMEbus 100 and computer interface 10. By way of example, interrupt controller 50 may be the MC68901 Multi-Function Peripheral Chip manufactured by Motorola which is initialized by a host CPU 101 over VMEbus 100. Upon instruction from local CPU 40, interface controller 60 either: 1) converts data stored in dual port RAM 20 into the asynchronous (type D or E) serial data and passes same to computer 200, or 2) converts asynchronous serial data from computer 200 into a parallel VMEbus format and stores same in dual port RAM 20.

The basic operation of interface 10 can be described as follows. When the host CPU 101 wants to output a data buffer to computer 200 via VMEbus 100, the data is placed in the dual port RAM 20. The VME MASTER control interrupts the operation of local CPU 40 via interrupt controller 50. The interrupt of CPU 40 will indicate that the VMEbus 100 has data for computer 200 and will cause CPU 40 to service the interrupt accordingly. In short, the data buffer is moved from the dual port RAM 20, over the local bus 30 and through interface controller 60 which converts the data buffer into an asynchronous (type D or E) serial format. According to MIL-STD 1397B, the asynchronous serial data flow to computer 200 is uni-directional while control signal flow is bi-directional as will be explained further hereinbelow.

When the computer 200 wishes to send data to the host CPU 101 via VMEbus 100, the data is converted to a parallel VMEbus format by interface controller 60, and moved to the dual port RAM 20 via local bus 30. Local CPU 40 will indicate to interrupt controller 50 that this transfer is complete. In response, interrupt controller 50 interrupts the VMEbus 100 via the VME MASTER control to indicate that there is data in the dual port RAM 20 waiting to be read.

Figure 2:
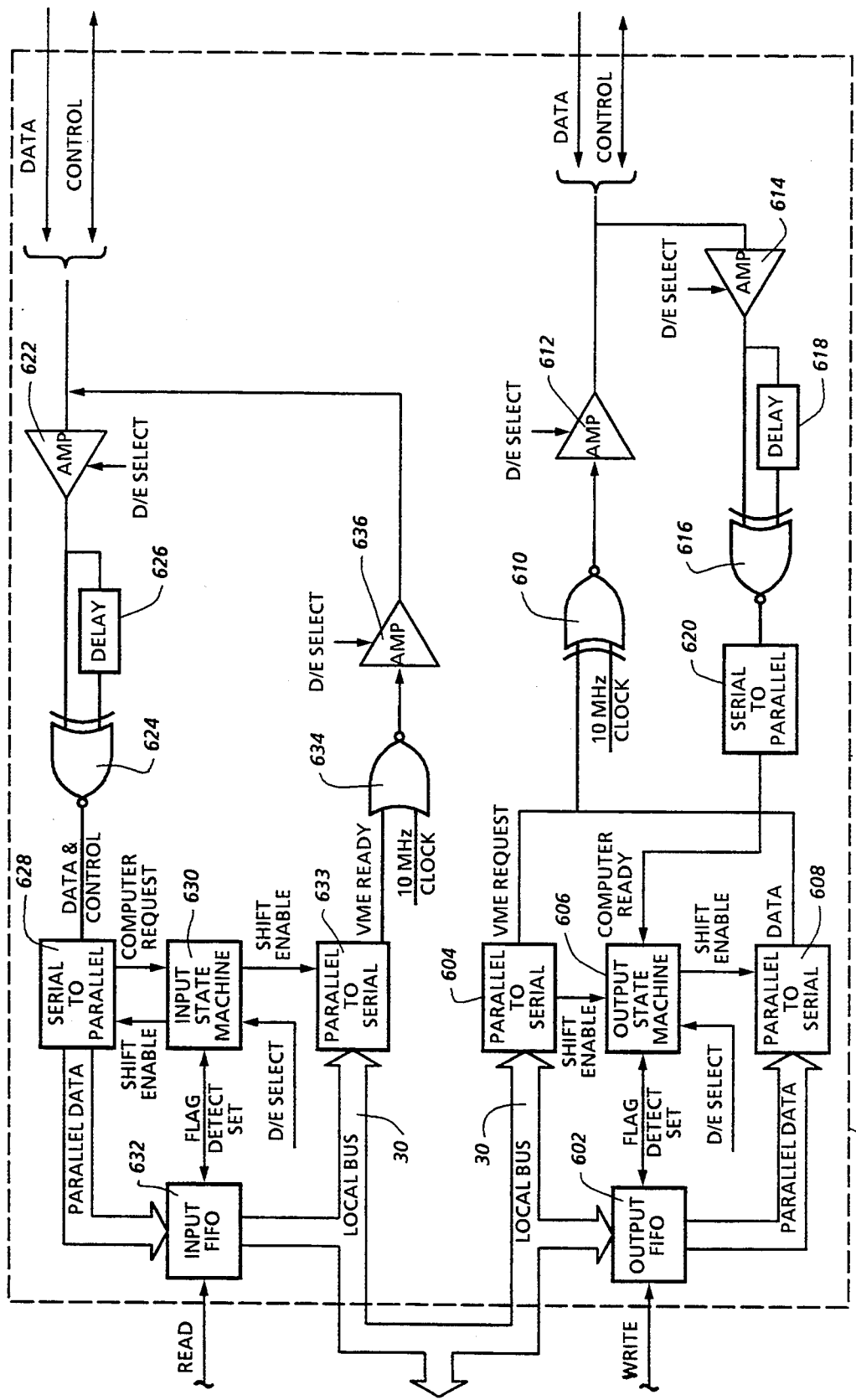
FIG. 2 is a schematic of the type D/E interface controller shown in FIG. 1.

A more detailed description of interface controller 60 and its function will now follow with reference to FIG. 2. Upon power-up or reset, the VMEMASTER interrupts local CPU 40 via interrupt controller 50. Local CPU 40 services such an interrupt by setting a bit in a control frame passed on local bus 30 to parallel-to-serial converter 632. Parallel-to-serial converter 632 is typically a conventional shift register. As will be explained further hereinbelow, converter 632 issues a VME READY to computer 200 to indicate that the VMEbus 100 is ready. As mentioned above, interrupt controller 50 indicates to local CPU 40 if a write to computer 200 or a read from computer 200 is required. In the case of a write to computer 200, local CPU 40 moves the parallel format data stored in dual port RAM 20 over local bus 30 to an output first-in, first-out (FIFO) memory 602. At the same time, local CPU 40 issues: 1) a WRITE control signal to output FIFO 602 which sets an internal EMPTY/NOT EMPTY flag to NOT EMPTY, and 2) a parallel format control signal over local bus 30 to a parallel-to-serial converter 604 (e.g. shift register) to generate a VME REQUEST. Accordingly, the parallel format control signal on local bus 30 is shifted through converter 604 and output as a transistor-transistor-logic (TTL) serial VME REQUEST control. As will be explained further hereinbelow, VME REQUEST is converted to asynchronous serial format as it passes through exclusive NOR gate 610 and amplifier 612. If computer 200 is ready to receive data, a COMPUTER READY control is issued.

An output state machine 606 detects the NOT EMPTY flag in output FIFO 602. In response to the NOT EMPTY flag and a COMPUTER READY control from computer 200, output state machine 606 issues a SHIFT ENABLE control to parallel-to-serial converter 608. Parallel-to-serial converter 608 may be conventional shift registers. Accordingly, the SHIFT ENABLE causes the parallel data from output FIFO 602 to be shifted through converter 608 to output a TTL serial DATA word.

A D/E SELECT is provided to output state machine 606 to specify whether computer 200 operates on type D or type E I/O. The D/E SELECT could be hardware or software selected. In either case, selection of type D or E governs certain protocol such as the size of the CONTROL frame output from converter 604 (i.e., type D is 3 bits and type E is 4 bits) and when CONTROL frames are sent (i.e. type D sends a CONTROL frame only when there is data in output FIFO 602 while type E sends a CONTROL frame according to a prescribed time schedule irrespective of the present or absence of data in output FIFO 602).

Figure 3A:
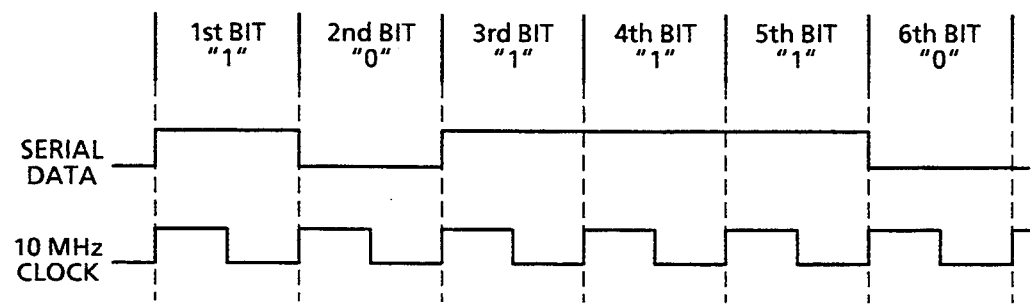
FIG. 3(a) is a graphic representation of a 6-bit serial data word and a 10 MHz clock pulse.
Figure 3B:
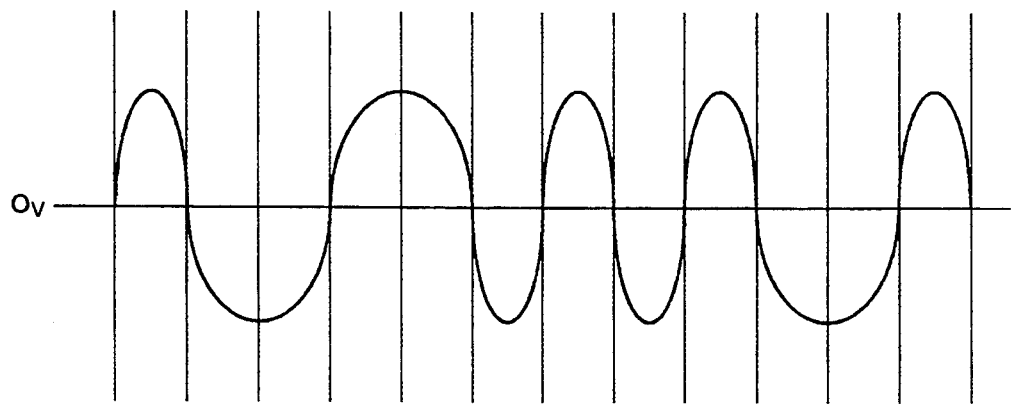
FIG. 3(b) is a graphic representation of the exclusive NOR combination of the 6-bit serial data word and 10 MHz clock pulse shown in FIG. 3(a)

The DATA words from converter 608 are supplied to exclusive NOR 610 along with a 10 MHz clock pulse. Exclusive NOR 610 outputs are amplified by an amplifier 612. Amplifier 612 is supplied with the D/E SELECT to set the output amplification at the appropriate bias voltage level (i.e., 3.25 volts nominal for a type D interface or 0.6 volts nominal for a type E interface). The output of amplifier 612 is the desired asynchronous serial data supplied to computer 200. This operation is shown graphically by way of example in FIGS. 3(a) and 3(b). In FIG. 3(a), a 6-bit digital data word (101110) is shown graphically along with a 10 MHz clock pulse. In FIG. 3(b), the exclusive NOR combination of the data word and clock in FIG. 3(a) is shown and represents the type D or E asynchronous serial data. Note that the D/E SELECT applied to amplifier 612 will set the peak limits of the asynchronous serial data.

As mentioned above, output state machine 606 issues the SHIFT ENABLE in response to the NOT EMPTY flag in output FIFO 602 and the COMPUTER READY received from computer 200. Note that computer 200 transmits and receives CONTROL frames in a bi-directional fashion. However, the COMPUTER READY must be converted from its asynchronous serial CONTROL format to the parallel format required by output state machine 606. Accordingly, the above described apparatus for converting from TTL serial to asynchronous serial data is reversed. Namely, the asynchronous serial CONTROL frame from computer 200 is amplified by an amplifier 614. Amplifier 614 is provided with the D/E SELECT to appropriately set the bias level of the asynchronous serial data to either the type D or E interface level as described above. An exclusive NOR 616 is provided to receive the output of amplifier 614. The second input to the exclusive NOR 616 is the output from amplifier 614 delayed by a delay unit 618 to serve as a clock pulse. Delay unit 618 extracts two signals (clock and data) from the input thereto. Any one of a variety of digital delay lines that are well known in the art will suffice. Typically, the delay is on the order of 30 nanoseconds. The output of exclusive NOR 616 is in TTL serial format. Finally, a serial-to-parallel converter 620 converts the TTL serial control into a parallel format COMPUTER READY.

In the case of a read from computer 200, a CONTROL word is issued from computer 200 in an asynchronous serial format. The CONTROL word is converted to a parallel format to serve as a COMPUTER REQUEST control to an input state machine 630. (Note that this conversion is essentially the same type of conversion that the CONTROL frame undergoes to serve as the COMPUTER READY for a write operation.) Specifically, the (asynchronous) CONTROL is input to amplifier 622 which is provided with the D/E SELECT to appropriately set the bias level as prescribed by one of the type D or E interface. The output of amplifier 622 is input as is to exclusive NOR 624 and as it is appropriately delayed by delay unit 626 to simulate a clock pulse. The TTL serial format output from exclusive NOR 624 is input to a serial-to-parallel converter 628 (e.g. shift register) which converts the TTL serial control into a parallel format COMPUTER REQUEST.

In response to the COMPUTER REQUEST, input state machine 630 checks the EMPTY/NOT EMPTY flag in an input FIFO 632. If the EMPTY flag is set, this is an indirect indication that VMEbus 100 is available to accept data from computer 200. Assuming this to be the case, input state machine 630 issues a SHIFT ENABLE to converter 633. Converter 633 shifts the control frame on local bus 30 to issue a VME READY in TTL serial format. The VME READY is converted to type D or E asynchronous serial format by passing through exclusive NOR 634 and amplifier 636 in the same fashion as described previously with respect to the DATA words being sent to computer 200.

Upon receiving the VME READY, computer 200 sends asynchronous serial data to be converted to a parallel format. The serial data passes through amplifier 622, exclusive NOR 624 and serial-to-parallel converter 628 in a similar fashion to that of the (asynchronous) CONTROL described previously. Input state machine 630 issues a SHIFT ENABLE to converter 628 to clock the serial data into and through converter 628 in order to output parallel data therefrom. The parallel data is thus input to the input FIFO 632 and input state machine 630 sets the EMPTY/NOT EMPTY flag to NOT EMPTY. In response to a READ from local CPU 40, the data in input FIFO 632 is read out over local bus 30 to dual port RAM 20. When input FIFO 632 is empty, input state machine sets the EMPTY/NOT EMPTY flag to EMPTY signifying that the VMEbus 100 is ready to accept more data if necessary.

Figure 4A:
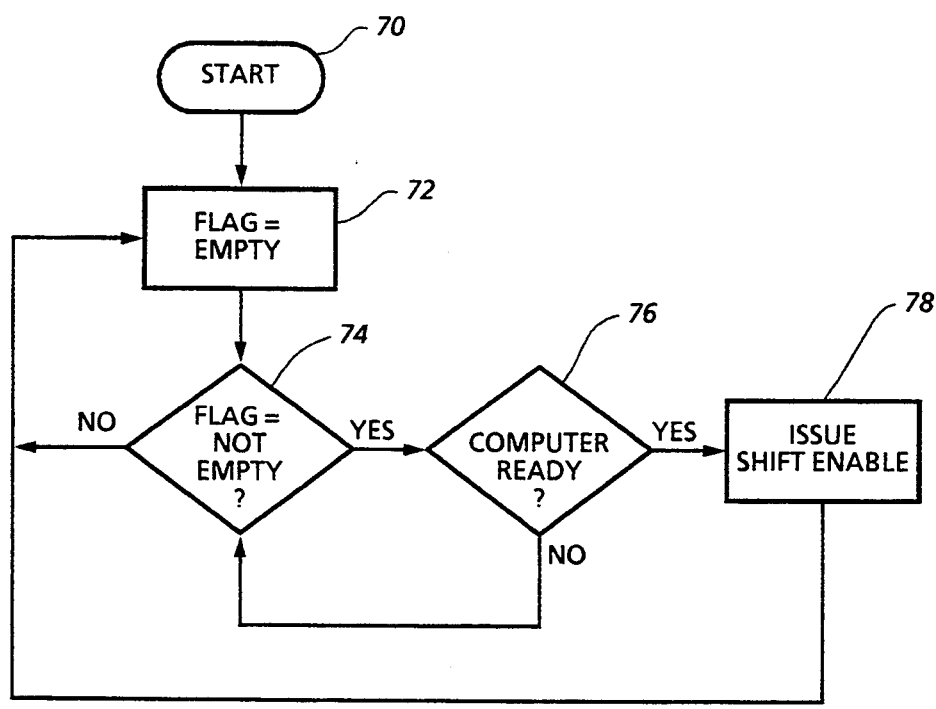
FIG. 4(a) is a flow chart illustrating the operation of the output state machine according to the present invention.
Figure 4B:
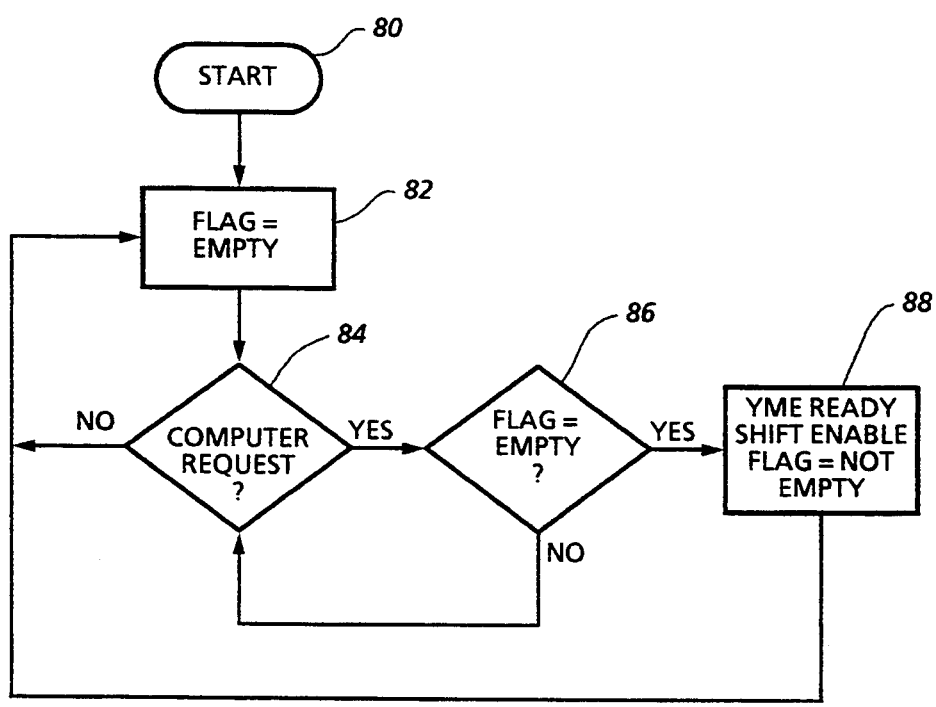
FIG. 4(b) is a flow chart illustrating the operation of the input state machine according to the present invention.

The logic flow of output state machine 606 and input state machine 630 is illustrated in the flow charts of FIGS. 4(a) and 4(b), respectively. Referring to the write operation shown in FIG. 4(a), output state machine 606 becomes functional at step 70 upon power-up or reset. The flow then proceeds to block 72 where the EMPTY/NOT EMPTY flag is set to EMPTY indicating that output FIFO 602 is available. In this state, output state machine 606 is idle until the flag is set to NOT EMPTY at step 74 indicating that output FIFO 602 has received data over local bus 30. Once set to NOT EMPTY, the flow proceeds to step 76 and awaits a COMPUTER READY. Upon receiving the COMPUTER READY, output state machine 606 issues the SHIFT ENABLE at block 78 to clock data through converter 608. The flag is then reset to EMPTY in output FIFO 602 and output state machine 606 returns to its idle state.

Referring to the read operation shown in FIG. 4(b), input state machine 630 becomes functional at step 80 upon power-up or reset. The flow then proceeds to block 72 where the EMPTY/NOT EMPTY flag is set to EMPTY indicating that input FIFO 632 is available. In this state, input state machine 630 is idle until it receives a COMPUTER REQUEST at step 84 indicating that computer 200 has data to send. Input state machine 630 then verifies that the VMEbus 100 can accept data by checking the flag in input FIFO 632. Accordingly, input state machine waits until the flag is set to EMPTY at step 86. If the flag is EMPTY, flow proceeds to block 88 where input state machine 630 issues a VME READY to computer 200, a SHIFT ENABLE to converter 628 and sets the flag in input FIFO 632 to NOT EMPTY. Upon completion, the flag is once again set to EMPTY at block 82 and input state machine 630 returns to its idle state.

Figure 5A:
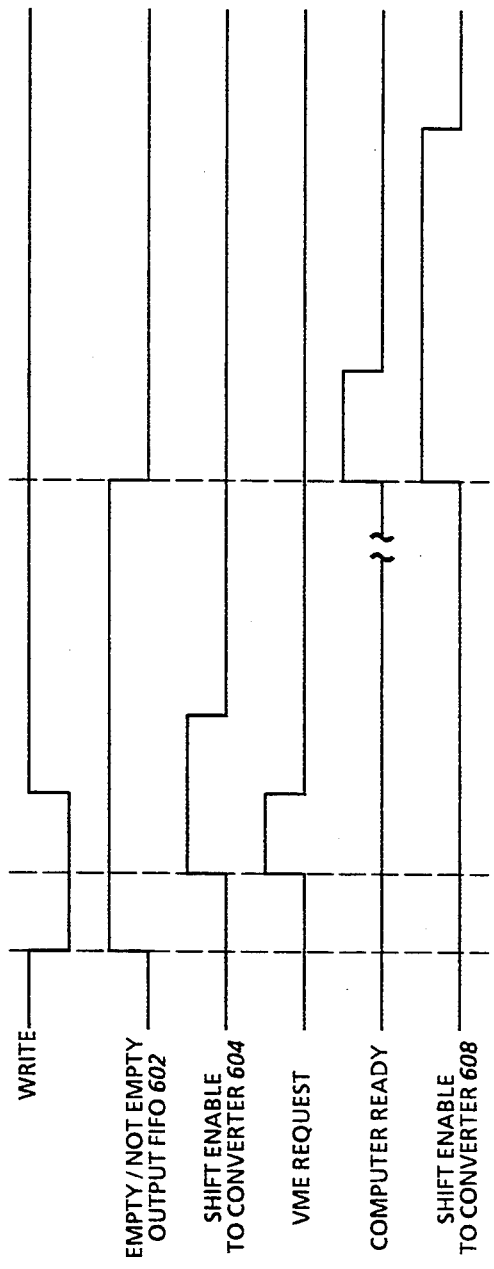
FIG. 5(a) is a timing diagram illustrating the timing of control signals in the write operation of the present invention.
Figure 5B:
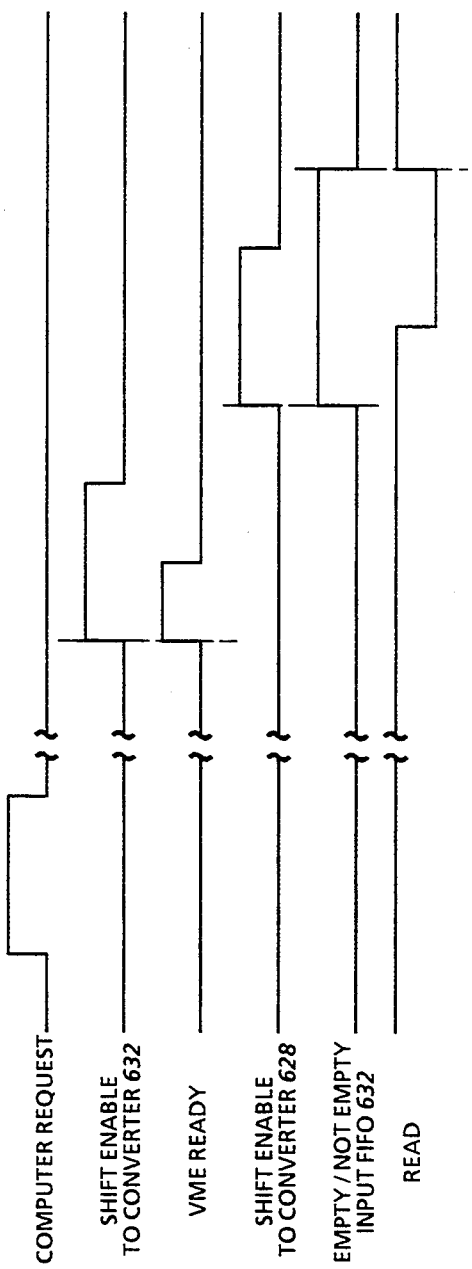
FIG. 5(b) is a timing diagram illustrating the timing of control signals in the read operation of the present invention.

Timing diagrams of the various control signals associated with the Type D interface protocol for one cycle of a write operation and for one cycle of a read operation are shown in FIGS. 5(a) and 5(b), respectively. (Timing diagrams can be developed in a similar fashion for Type E interface protocol.) Referring to the timing signals associated with the write operation depicted in FIG. 5(a), local CPU 40 issues a WRITE control signal to output FIFO 602. The WRITE causes the EMPTY/NOT EMPTY flag of output FIFO 602 to go high (i.e., NOT EMPTY). Output state machine 606 issues a 3-bit SHIFT ENABLE to converter 604 which outputs the VME REQUEST to computer 200. When a COMPUTER READY is received, output state machine 606 issues a SHIFT ENABLE to converter 608 thereby shifting out the DATA in output FIFO 602. This is turn causes the EMPTY/NOT EMPTY flag in output FIFO 602 to go low (i.e., EMPTY).

Referring now to the timing signals associated with the read operation depicted in FIG. 5(b), a 3-bit COMPUTER REQUEST is received at input state machine 630. If the EMPTY/NOT EMPTY flag of input FIFO 632 is low (i.e., EMPTY), a SHIFT ENABLE is issued to converter 632 to serialize the VME READY to computer 200 while a SHIFT ENABLE is issued to converter 628 to shift DATA words into input FIFO 632. Once the DATA is in input FIFO 632, the EMPTY/NOT EMPTY flag of input FIFO 602 goes high (i.e., NOT EMPTY). Local CPU 40 issues a READ control to read DATA from input FIFO 632. At conclusion of the READ, the EMPTY/NOT EMPTY flag of input FIFO 632 goes low (i.e., EMPTY).

Although the invention has been described relative to a specific embodiment thereof, there are numerous variations and modifications that will be readily apparent to those skilled in the art in the light of the above teachings. For example, the dual port RAM may be replaced with two separate RAMs although this may require additional arbitration hardware. It is therefore to be understood that, within the scope of the appended claims, the invention may be practiced other than as specifically described.

What is claimed and desired to be secured by Letters Patent of the United States is:

1. A computer interface for supporting communication between a host processor's VMEbus and a computer having its input/output (I/O) interface based on MIL-STD 1397B Type D or E asynchronous serial data specifications, comprising:

memory means coupled to the VMEbus for temporary storage of VMEbus data being transferred from the VMEbus to the computer;

a local bus coupled to said memory means;

interrupt control means coupled to the VMEbus and said local bus, said interrupt control means for generating a processor interrupt on said local bus in response to an interrupt control signal passed on the VMEbus by the host processor;

processor means coupled to said local bus for generating a write control signal in response to the processor interrupt and for transferring the VMEbus data stored in said memory means onto said local bus in response to the processor interrupt;

interface control means, coupled to said local bus and the computer, said interface control means responsive to the write control signal, for transferring the VMEbus data on said local bus to the computer as asynchronous serial data in accordance with one of MIL-STD 1397B type D or E I/O interface specifications said processor means, in response to a request-to-send control signal generated by the computer, further for generating a read control signal for passage to said interface control means and for generating an interrupt control signal on said local bus;

said interface control means, in response to the read control signal, further for transferring, from the computer to said memory means via said local bus, asynchronous serial data in accordance with one of MIL-STD 1397B type D or E I/O interface specifications as computer data for temporary storage in said memory means; and said interrupt control means further for generating a VME interrupt on the VMEbus in response to the interrupt control signal on said local bus, wherein the host processor accesses said memory means via the VMEbus in response to the VME interrupt.

2. A computer interface as in claim 1 wherein said memory means is a dual port random access memory (RAM).

3. A computer interface as in claim 1 wherein said processor means is a programmable central processing unit (CPU).

4. A computer interface as in claim 1 wherein said interface control means comprises:

a first first-in, first-out (FIFO) memory means for temporary storage of the VMEbus data;

a second FIFO memory means for temporary storage of the computer data;

a first state machine means for occupying an idle state in the absence of the write control signal, and a write enable state in response to the presence of the write control signal and the presence of VMEbus data in said first FIFO memory means;

a second state machine means for occupying an idle state in the absence of the request-to-send control signal, and a read enable state in response to the presence of the request-to-send control signal and the absence of computer data in said second FIFO memory means;

parallel-to-serial conversion means for converting the VMEbus data into VMEbus transistor-transistor-logic (TTL) serial data when said first state machine means occupies the write enable state;

means for converting the VMEbus TTL serial data into the asynchronous serial data in accordance with MIL-STD 1397B;

means for converting the asynchronous serial data from the computer into computer TTL serial data when said second state machine means occupies the read enable state; and serial-to-parallel conversion means for converting the computer TTL serial data into computer data.

5. A computer interface according to claim 4 wherein said means for converting the VMEbus TTL serial data comprises:

an exclusive NOR gate having the VMEbus TTL serial data as a first input and a 10 MHz clock pulse as a second input, and having an output; and amplifier means for amplifying the output of said exclusive NOR gate to one of a type D or E bias voltage level associated with a corresponding one of the Type D or E I/O interface specifications.

6. A computer interface according to claim 4 wherein said means for converting the asynchronous serial data from the computer comprises:

amplifier means for amplifying the asynchronous serial data from the computer to one of a type D or E bias voltage level associated with a corresponding one of the Type D or E I/O interface specifications, and having an output; and an exclusive NOR gate having the output of said amplifier means as a first and second input thereof, wherein the second input is delayed by delay means.

7. A computer interface as in claim 4 wherein said parallel-to-serial conversion means and said serial-to-parallel conversion means comprise shift registers.

* * * * *